United States Patent Office 3,404,349
Patented Oct. 1, 1968

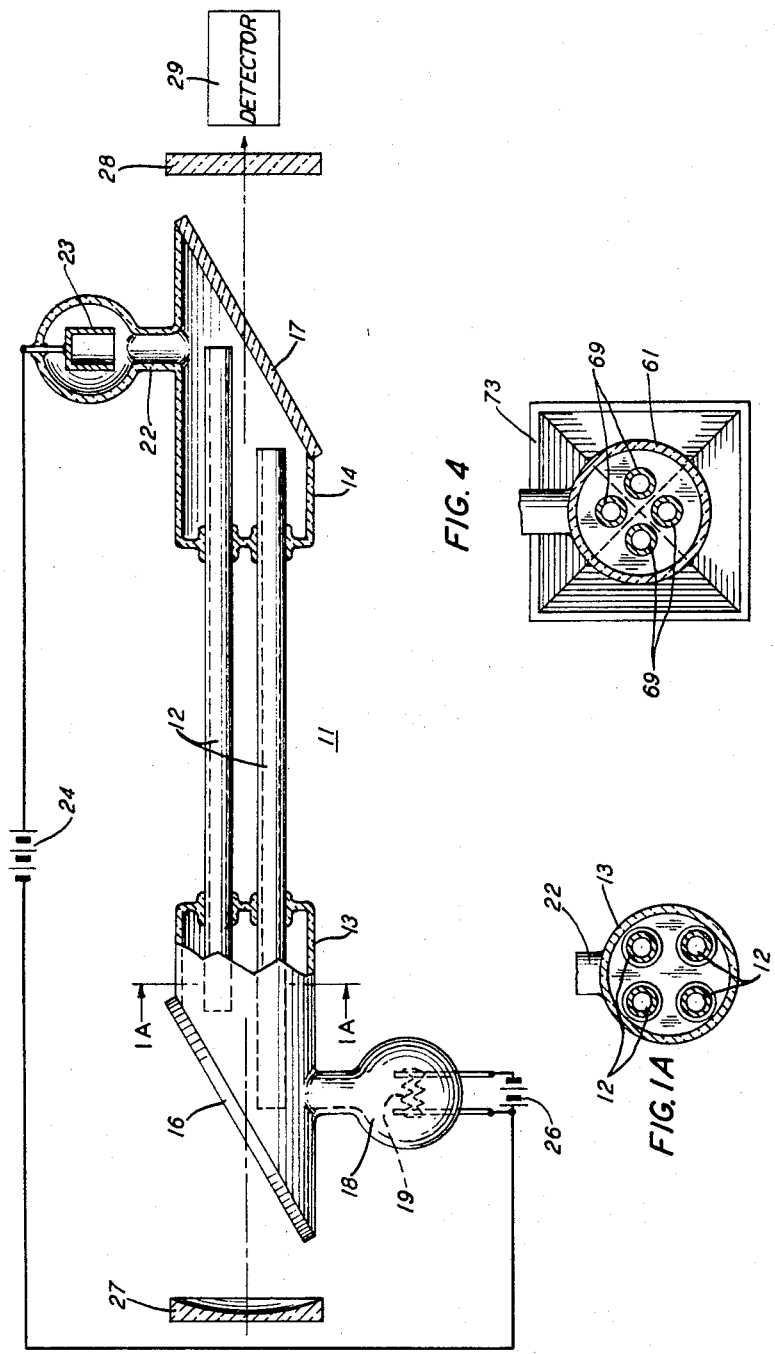

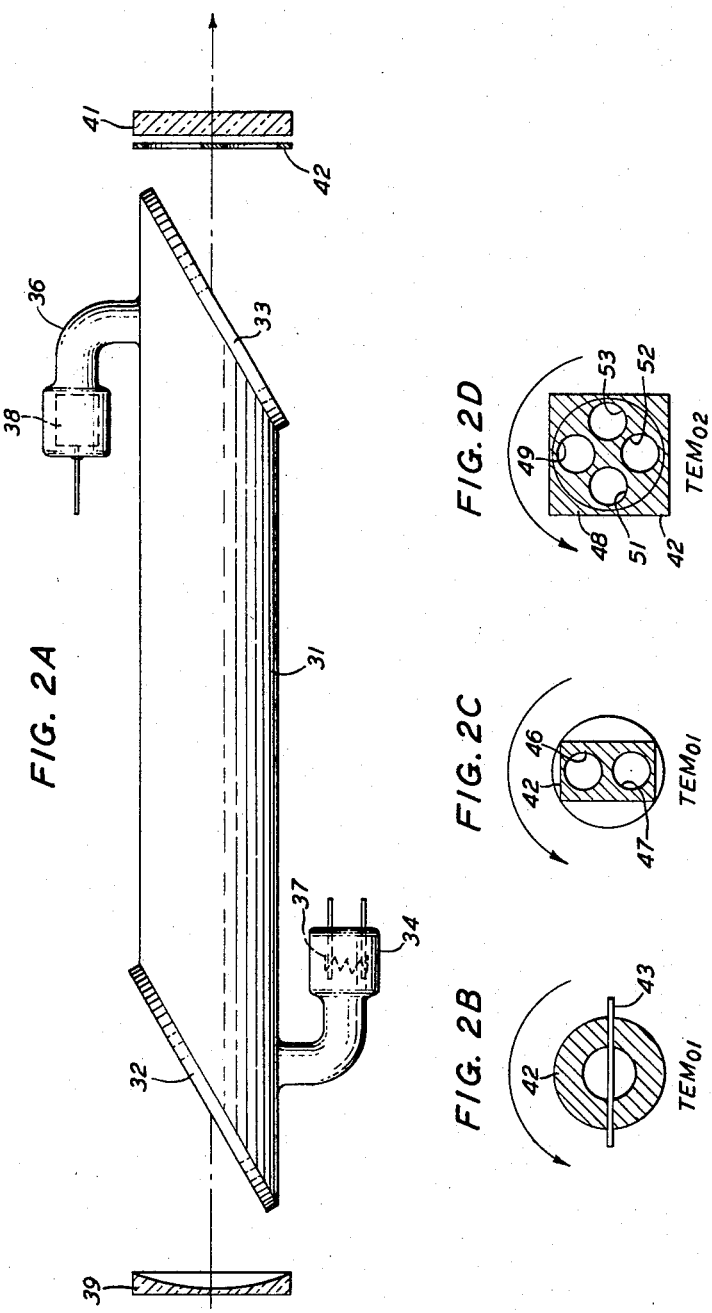

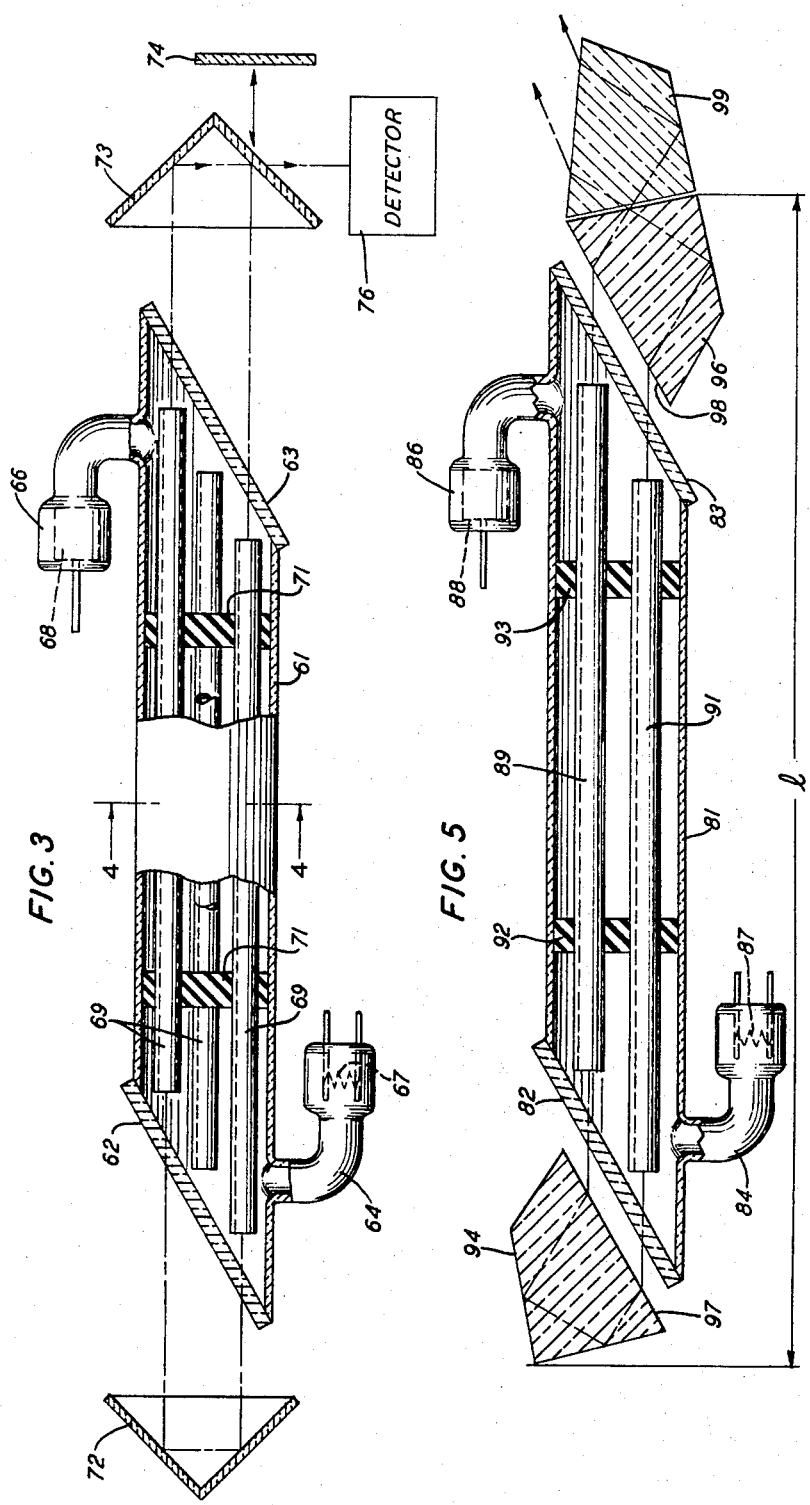

3,404,349
OPTICAL MASER FOR HIGHER ORDER MODES
William W. Rigrod, Millington, N.J., assignor to Bell Telephone Laboratories, Incorporated, New York, N.Y., a corporation of New York
Filed Apr. 28, 1964, Ser. No. 363,113
9 Claims. (Cl. 331—94.5)

ABSTRACT OF THE DISCLOSURE

An optical maser is made to oscillate in higher order modes instead of the fundamental mode by utilizing dielectric boundaries to enhance the higher modes and masking techniques to suppress the fundamental. Particular higher order modes can be used as rotation rate sensors.

---

This invention relates to optical maser devices and, more particularly, to such devices which are primarily useful as measuring or sensing instruments.

In general, optical masers contain or comprise an active medium in a cavity resonator which, upon proper stimulation, is made to oscillate at a frequency or frequencies in or near the visible portion of the electromagnetic spectrum, producing a coherent light output. In a properly designed resonator, which usually comprises spaced optically reflecting surfaces, the greatest portion of the energy output of the device is concentrated in the fundamental, or $TEM_{00}$ mode of oscillation. Higher order modes can exist within the active medium but ordinarily they do not contain enough energy or power to be useful.

Optical masers are susceptible of many uses in a number of fields. One area in which these devices have proven to be quite useful is the measurement of rotation rates, such as, for example, the rate of rotation of the earth. In rotation rate sensing systems, the most common arrangement is an array of optical masers lying in the same plane and oriented at right angles to each other to form a square or loop. Mirrors located at the corners of the square divert light output from one optical maser into the next succeeding one, located at right angles to the first, thereby forming a closed loop path for the light. Such an arrangement can measure to a high degree of accuracy the rate of rotation of the system about an axis normal to the plane of the optical masers.

Despite the accuracy of such a system as a rotation sensor or measurer, there are certain inherent shortcomings. Such a system is necessarily fairly large and bulky, and has a high inertia, thereby being somewhat slow in its response to rotation. In addition, because of its size, such a system does not lend itself to applications where space is at a premium or to the measurement of very high rotation rates. A further drawback is the relative complexity of the system due to the necessity of having a plurality of optical masers, or lasers, and a plurality of mirrors, all of which must be accurately positioned to produce the desired results.

A shortcoming of many optical maser arrangements arises from the fact that the mirrors or reflecting surfaces which form the resonator are quite narrowband in their action. That is, they produce optimum reflection at only one optical frequency, and their reflectivity falls off rapidly at frequencies removed from this one frequency. As a consequence, the laser system itself is inherently narrowband and not amenable to any significant degree of tuning. Some reflecting surfaces, such as silvered surfaces or highly polished metallic surfaces do exhibit reflectivity over a broadband. However, these materials are quite lossy, thereby reducing the gain available and, consequently, the efficiency and power output of the system.

It is an object, therefore, of the present invention to measure rotation rates with an apparatus that is quite simple, has a fast response to rotation, and is extremely compact.

It is another object of the present invention to produce broadband oscillations and/or amplification in an optical maser.

The present invention makes use of the fact that an optical maser oscillates simultaneously in a large number of modes. The gain in any desired mode can be considerably enhanced by masking out or otherwise suppressing oscillations in other modes, such as by reducing the Q of the laser for these unwanted modes. When the fundamental or axial mode is suppressed, much of the energy available for it is transferred to the higher order, off-axis modes. In addition, when dielectric barriers are introduced near the regions of maximum power of these higher modes, their power is further increased. Accordingly, the laser produces a usable output in the higher order modes. As will be explained more fully hereinafter, these off-axis higher order modes are utilized in the present invention to detect and measure the rate of rotation about the optic axis of the laser.

In a first illustrative embodiment of the invention, a plurality of small bore tubes surrounds the axis of the laser and are spaced therefrom a distance such that the centerlines of the tubes coincide with the regions of maximum amplitude of the desired higher order mode. Hollow bulb portions at the ends of the tubes function as supports for the tubes to which they are hermetically sealed, and the ends of the bulbs are sealed with Brewster windows. The bulbs also contain the necessary electrodes for exciting the active medium which, in the present embodiment, is a suitable gas such as neon or a mixture of gases, such as helium-neon. With such an arrangement, the active medium is present only in the regions of oscillation maxima of the higher order mode. The entire assembly is situated in a cavity resonator formed by a pair of external mirrors.

In a second illustrative embodiment of the invention, a cylindrical gas filled optical maser is situated within a resonant cavity formed by a pair of mirrors or reflecting members which are located externally of the gas filled member. In accordance with the principles of the present invention, at least one of the mirrors is masked so that it exhibits reflectivity only at certain areas on its face, these areas corresponding to the regions of maximum intensity for the desired higher order mode. Inasmuch as the various mode patterns are known or can be easily determined, the masks can readily be fabricated to emphasize the desired mode and suppress the unwanted modes.

In a third illustrative embodiment of the invention, four small bore tubes are mounted in a large cylindrical member sealed at its ends by Brewster windows and contain a gaseous active medium. Externally of the cylindrical member is an arrangement of mirrors or reflecting members which reflect the light emerging from the active medium in two planes back through the medium. That is, light generated in one pair of diametrically opposed tubes is confined to a closed loop path containing the tubes and in a plane defined by the tubes, and light generated in the second pair of diametrically opposed tubes is confined to a closed loop path in a plane normal to the plane of the other loop path. Emergent light from each path is applied to a detector in a manner such that rotation about a pair of axes normal to each other and to the axis of the maser is measured.

A fourth illustrative embodiment of the invention utilizes corner prisms to produce closed paths for oscillations in one of the higher order modes, and, as will be explained more fully hereinafter, gives broadband operation of the optical maser system.

It is a feature of the present invention that boundaries are presented to the preferred off-axis regions in an optical maser so that the gain in these regions is enhanced while the gain in other regions of the maser is suppressed.

It is another feature of the present invention that higher order modes of oscillation of an optical maser ($TEM_{0n}$ modes) are utilized to produce a rotation sensitive arrangement.

These and other features of the present invention will be more readily apparent from the following detailed description, taken in conjunction with the accompanying drawings, in which:

FIG. 1 is a side elevation, partially sectioned view of a first illustrative embodiment of the invention;

FIG. 1A is a cross section of the embodiment of FIG. 1;

FIGS. 2A through 2D depict a second illustrative embodiment of the invention with alternative ways of producing the desired results;

FIG. 3 is a side elevation, partially sectioned view of another illustrative embodiment of the invention;

FIG. 4 is a cross-section view of the embodiment of FIG. 3; and

FIG. 5 is a side elevation, partially sectioned view of still another illustrative embodiment of the invention.

Turning now to FIG. 1, there is depicted a first illustrative embodiment 11 of the present invention for sensing or measuring rotation about an axis parallel to or coincident with the axis of the device. Device 11 comprises a plurality of hollow cylindrical tubes 12 of glass or other suitable dielectric material spaced from the axis of the device 11. First and second hollow bulb portions 13 and 14 are hermetically sealed to the tubes 12 and act as supports therefor. Bulbs 13 and 14 are sealed at their ends by flat portions 16 annd 17, respectively, of suitable light transparent material oriented at the well known Brewster angle. Bulb portion 16 has a hollow protuberance 18 which contains an exciting electrode 19 and bulb portion 21 has a hollow protuberance 22 which also contains an exciting electrode 23. The entire assembly is filled with an active medium such as a mixture of helium and neon gases which, when excited or stimulated, emits light. To excite the active medium, electrodes 19 and 23 are connected to voltage sources 24 and 26, shown schematically as batteries, but which may take any one of a number of forms well known to workers in the art.

Axially aligned with the arrangement of tubes 12 and bulbs 13 and 14 are a pair of mirrors 27 and 28 of which mirror 28, at least, is partially light transmissive. Mirrors 27 and 28 form a cavity resonator in a manner well known to workers in the art, and the entire assembly forms an optical maser, or laser. The light output of the laser is directed through mirror 28 to a light detector 29 which may take any one of a number of forms known to workers in the art, such as a photovoltaic or photoconductive device or any other type which has a rapid response to light variations.

The entire assembly 11 is mounted on or in whatever device or system the rotation of which is to be sensed or measured.

In operation, the optical maser is excited into oscillation by application of the proper excitation voltage to the active medium. As was pointed out in the foregoing, in any optical maser, there is a tendency to oscillate in higher order modes as well as in the fundamental or axial modes. These higher order modes differ from the fundamental mode in that they are spaced from the axis of the laser and have more than one point, or lobe of maximum power. Thus, a $TEM_{01}$ mode has two diametrically opposed 180° angularly spaced maxima, a $TEM_{02}$ mode has four 90° angularly spaced maxima, a $TEM_{03}$ mode has six 60° angularly spaced maxima, and so on. In the arrangement of FIG. 1, the four tubes 12 are aligned with the maxima of the $TEM_{02}$ mode so that their axes coincide therewith. Because the modes of oscillation can be generated only in the active medium, and the tubes 12 confine the active medium to the areas or regions of the maxima of the $TEM_{02}$ mode, oscillation in modes other than the $TEM_{02}$ mode, including the fundamental mode, is effectively suppressed. In addition, the gain in the $TEM_{02}$ mode is greatly enhanced over what it would normally be because the available energy is largely confined to the regions of that mode's maxima, and because those regions are closely bounded by dielectric material, i.e., the walls of the tubes, which, as is well known to workers in the art, tends to increase gain.

The light energy that is produced travels back and forth between the two mirrors 27 and 28, increasing in energy content or amplitude as it does so. This back and forth energy can be considered to be, or resolved into, a forward traveling wave and a backward traveling wave. In addition, each of these waves, in any given transverse plane normal to the axis, has a transverse standing wave pattern. This standing wave can, in a manner analogous to microwave analysis, be resolved into two counter-rotating waves of the same frequency and equal but opposite periods of rotation.

When the system on which the arrangement 11 is mounted rotates about an axis parallel to that of arrangement 11 or when there is a component of rotation having such a parallel axis, the aforementioned counter-rotating waves are affected. The rotation enhances or increases the speed of rotation of that wave rotating in the same direction as the rotation of the system while the oppositely rotating wave is slowed down. Thus, a Doppler shift is produced in the rate of rotation of the two waves, giving rise to a beat frequency that is proportional to the difference in rotation rate and hence, proportional to the rate of rotation of the system. As a consequence, the output of the laser impinges on the detector 29 in the form of a light beam having a sinusoidal variation in amplitude. The frequency of this sinusoidal variation is a measure of the rate of rotation of the system. The output of the detector, which may be a voltage or current proportional to the frequency of the variation in amplitude of the light beam may be fed to a utilization device, not shown, which may be a metering arrangement, an arrangement for correcting the rotation, or any one of a number of possible devices or arrangements.

From the foregoing, it can readily be appreciated that the device of FIG. 1 is a compact, simple, rotation rate detector which, by virtue of its use of optical frequencies, is quite sensitive, accurate and quick in its response to rotation or changes in rotation.

A second rotation rate sensor utilizing the principles of the present invention is shown in FIG. 2A. The sensor of FIG. 2A comprises a hollow cylindrical tubular member 31 of glass or other suitable material sealed at its ends by flat light transmissive plates 32 and 33, oriented at the well known Brewster angle. Hollow projections 34 and 36 extend from member 31, and contain exciting electrodes 37 and 38, which, as was the case with electrodes 19 and 23 of FIG. 1, are connected to suitable excitation means, not shown. Member 31 is filled with a suitable optically active medium, such as a mixture of helium and neon gases which, upon excitation, emits coherent light. A pair of mirrors 39 and 41 are aligned with member 31 and oriented at right angles to the axis thereof. Mirrors 39 and 41 form a cavity resonator for the production of coherent laser oscillations, the output of the resonator passing through mirror 41, which is partially transparent.

As thus far described, the arrangement of FIG. 2A, upon excitation, functions as a typical optical maser, and its greatest or dominant output is in the fundamental mode. In order that the arrangement may be made to function as a rotation rate sensor, a mask 42 of dielectric nonreflecting material is placed adjacent the reflecting surface of mirror 41. While mask 42 is shown as a separate member, it may of course, take the form of a nonreflecting coating on the face of mirror 41. Mirror 41 is designed to mask or cover the reflecting surface of mirror 41 except those areas which coincide with the area of maximum gain of the particular higher order mode desired. FIGS. 2B through 2C depict three possible mask configurations for enhancing the $TEM_{00}$, $TEM_{01}$, and $TEM_{02}$ modes of oscillation. In FIG. 2B, mask 42 comprises an annular ring of dielectric material bisected by a nonreflecting strip or wire 43. Such a mask suppresses the fundamental mode and higher order modes except the $TEM_{01}$ mode, which is enhanced. FIG. 2C shows another mask configuration for enhancing the $TEM_{01}$ mode and suppressing unwanted modes. The mask of FIG. 2C comprises a dielectric nonreflecting strip 44 having a pair of holes 46 and 47 located to coincide with the areas of maximum intensity of the $TEM_{01}$ mode. FIG. 2D shows a mask for enhancing the $TEM_{02}$ mode, while suppressing unwanted modes. The mask of FIG. 2D comprises a nonreflecting dielectric member 48 having a plurality of holes 49, 51, 52 and 53 which coincide with the regions of maximum intensity of the $TEM_{02}$ mode.

The operation of the arrangement of FIG. 2A is the same as described for the arrangement of FIG. 1. Rotation about an axis parallel to the axis of member 31 produces a Doppler shift and a beat frequency which is detected by a suitable detector, not shown.

Thus far, the principles of the invention have been disclosed in their application to rotation rate sensors where the rotation is about an axis parallel to the axis of the optical maser, or has a component of rotation about such an axis. The principles of the invention are also applicable to rotation sensing about axes normal to the axis of the optical maser. In FIG. 3, there is shown an embodiment of the invention which measures rotation about axes normal to the axis of the optical maser.

The arrangement of FIG. 3 comprises an elongated, hollow, tubular member 61 of glass, or other suitable material, sealed at its ends by a pair of flat light transmissive plates 62 and 63 of glass, or other suitable material, oriented at the Brewster angle. A pair of hollow protuberances 64 and 66 contain exciting electrodes 67 and 68, respectively. Within tubular member 61 are mounted a plurality of hollow dielectric tubes 69, suitably, but not necessarily of glass, with their axes spaced from the axis of tube 61. In the arrangement of FIG. 3, four tubes 69 are shown for producing oscillation along axes spaced from the central axis. Tubes 69 are held in proper position and orientation by dielectric spacer members 71 which are opaque to, and nonreflective of, light. Tube 61 is filled with a suitable active medium, such as neon gas or a mixture of gases. Externally of member 61 and axially aligned therewith are a pair of mirrors 72 and 73 which form a cavity resonator for the optical maser. Mirrors 72 and 73 are in the form of four-sided hollow pyramids with the internal walls light reflecting. While a pyramidal mirror arrangement is shown, other suitable mirror arrangements may also be used. Mirror 73 is also constructed to be partially light transmissive. Beyond mirror 73 is a totally reflecting mirror 74 and oriented at right angles thereto is a detector 76.

In operation, upon application of suitable excitation from an exciting source, not shown, the optical maser commences to oscillate. Inasmuch as the opaque dielectric spacers prevent oscillation in the fundamental mode and other higher order modes, the optical maser will tend to oscillate in the regions defined by the tubes 69. The optical wave energy in one pair of diametrically opposed tubes 69 travels a closed path, as depicted by the arrows in FIG. 3, while the wave energy in the other pair of diametrically opposed tubes 69 travels a closed path in a plane normal to the plane of the first closed path.

One pair of opposite internal reflecting walls of mirrors 72 and 73 function to complete the closed path in one plane while the other pair of opposite internal walls function to complete the other closed path at right angles to the first. The output of the maser in one plane passes through mirror 73 and is reflected back by totally reflecting mirror 74 until it impinges upon an outer wall of mirror 73, as shown. The outer wall of mirror 73 is made reflecting so that the energy thus reflected from mirror 74 is reflected at right angles into detector 76. The energy output from the other closed path within the maser is likewise reflected by a totally reflecting mirror and directed into a detector, which have, for simplicity, not been shown but which are arranged and oriented in the manner of mirror 74 and detector 76.

As was pointed out in the foregoing, the longitudinally traveling light wave within the maser can readily be resolved into a forward and backward traveling wave. When rotation occurs about an axis normal to the plane of the paper, the forward and backward traveling waves in the closed loop lying in the plane of the paper are affected differently by the rotation, that is, one of the waves is speeded up and the other is slowed down, thus there is a Doppler shift between the two waves giving rise to a beat frequency which is a measure of the rate of rotation and which is detected in detector 76 and applied to a suitable utilization device, not shown. In like manner, rotation about an axis lying in the plane of the paper produces a Doppler shift in the forward and backward traveling waves in the closed loop lying in a plane normal to the paper, giving rise to a beat frequency, the frequency of which is the rate of rotation and which is detected by a detector, not shown. It can readily be seen, therefore, that the arrangement of FIG. 3 detects rotation about axes that are at right angles to each other and normal to the longitudinal axis of the optical maser.

It has been found by applicant that a fused quartz corner reflector prism having a Brewster angle input and output face exhibits substantially lower reflection losses than dielectric coated mirrors for resonator modes with zero intensity at the optic axis, i.e., odd order modes. In addition, these prisms exhibit a low loss reflectance over a relatively wide band of frequencies. In FIG. 5, there is shown an illustrative embodiment of the invention which functions as a broadband optical maser.

The arrangement of FIG. 5 comprises an elongated hollow tube 81 of glass or other suitable material sealed at its ends by flat light transmissive windows 82 and 83 oriented at the Brewster angle. Hollow protuberances 84 and 86 contain exciting electrodes 87 and 88, respectively. Within tube 81 are mounted a pair of hollow tubes 89 and 91 of glass or other suitable material, and held in place by opaque, nonreflecting members 92 and 93 so that their axes coincide with the areas of maximum intensity of the $TEM_{01}$ mode. Tube 81 is filled with any suitable active medium, such as, for example, a mixture of noble gases. Externally of the tube 81 is a pair of ninety degree corner prisms 94 and 96 whose input faces 97 and 98, respectively, are parallel to the Brewster angle windows 82 and 83, respectively. An output coupling prism 99 is located adjacent one face of prism 96.

In operation, upon excitation by a suitable source, not shown, the optical maser commences to oscillate. Inasmuch as members 92 and 93 prevent oscillation in the normal and higher order modes, the oscillation is confined within tubes 89 and 91, and hence to the $TEM_{01}$ mode. As can be seen, the light generated is internally reflected by prisms 96 and 97 so that it travels a closed loop path. The output of the cavity resonator formed by the prisms is collected by coupling prism 99 and directed to a suitable utilization device, not shown. Because the areas of maximum intensity of the $TEM_{01}$ mode are removed from the axis of the optical maser substantially complete reflection by prisms 96 and 97 is assured, since the internal reflection points are well removed from the prism corner. In addition, the design and use of output coupling prism 99 is materially simplified.

Because of the broadband characteristics of the prisms, the arrangement of FIG. 5 functions as a broadband oscillator or amplifier. In addition, in applications, such as exploratory spectroscopy, different transition lines can be brought to oscillation without the necessity of using mirrors coated for peak reflectance at different wavelengths.

In experimental work on optical frequency mixing and parametric amplification, it has been shown that such operations best take place in an active medium or material whose energy levels satisfy resonant conditions for one or more of the optical waves involved. An arrangement such as that of FIG. 5 can resonate at all of the frequencies of interest without introducing any additional losses, hence, the arrangement of FIG. 5 can be used to investigate various possible active media.

In the foregoing, the principles of the invention have been disclosed in a number of specific embodiments. Various other embodiments and uses of these principles may occur to workers in the art without departure from the spirit and scope of the invention. For example, while the principles of the invention have been demonstrated using gaseous lasers, solid state laser devices might be used as well.

What is claimed is:

1. An optical maser device comprising spaced reflecting surfaces forming an optical frequency cavity resonator, a member containing an active medium within said resonator, said resonator and said member being characterized by an axial region of oscillation and a plurality of off-axis regions of oscillation upon excitation of said active meduim, means for exciting said active medium, means for enhancing the oscillation in off-axis regions of said device comprising a plurality of longitudinally extending hollow dielectric tubes defining bounding means for at least a portion of said regions, means for suppressing oscillations in the axial region of oscillation of said device, and means for extracting oscillatory energy from said device.

2. An optical maser device as claimed in claim 1 wherein the active medium is contained solely in a plurality of hollow dielectric tubes spaced from the axis of the device over at least a portion of the length of said device.

3. An optical maser device as claimed in claim 1 wherein said enhancing means comprises a plurality of hollow dielectric tubes mounted within a hollow dielectric member and spaced from the axis thereof, and means for holding said tubes in spaced relationship comprising dielectric spacers which are opaque in the axial region of oscillation of said device.

4. A rotation rate sensor comprising an optical maser device having a pair of reflecting surfaces forming an optical cavity resonator, said device being characterized by having a fundamental mode of oscillation and a plurality of higher order modes of oscillation, at least one member containing an active medium within said resonator, means for exciting said medium into oscillation, means for enhancing oscillations in a higher order mode and suppressing oscillations in the fundamental mode, said means comprising dielectric boundaries in the regions of oscillation of the higher order mode, means for extracting higher order mode energy from said resonator, and means for detecting any frequency difference between wave components of the extracted energy resulting from the rotation of said device.

5. A rotation rate sensor as claimed in claim 4 wherein said dielectric boundaries comprise a plurality of elongated hollow tubes containing the active medium, the axes of said tubes coinciding with the centers of the regions of oscillation of the higher order mode.

6. A rotation rate sensor as claimed in claim 4 wherein said dielectric boundaries comprise apertures in an opaque mask adjacent one of said reflecting surfaces, the centers of the apertures coinciding with the centers of the regions of oscillation of the higher order mode.

7. A rotation rate sensor comprising an optical maser device having a plurality of reflecting surfaces forming an optical frequency cavity resonator, at least one member containing an active medium within said resonator, means for exciting said medium into oscillation in regions removed from the axis of said member, a first pair of said regions extending longitudinally of said member and lying in a first plane and a second pair of said regions extending longitudinally of said member and lying in a second plane at an angle to said first plane, said reflecting surfaces forming closed loop paths for oscillations in said first and second plane, means for extracting oscillatory energy from said resonator, first detecting means for detecting frequency differences in wave components of oscillations in said one plane and second detecting means for detecting frequency differences in wave components of oscillations in said second plane, the frequency differences arising from rotation of said device.

8. A rotation rate sensor as claimed in claim 7 wherein said reflecting surfaces are in the form of four sided hollow pyramids, the internal walls of which are at least partially reflecting.

9. An optical maser device comprising an elongated member containing an active medium, reflecting members forming a cavity resonator adjacent the ends of said member, said active medium having, upon excitation, an axial region of oscillation and a plurality of off-axis regions of oscillation, said reflecting members comprise first and second prisms each having a pair of internal reflecting faces oriented at an angle to each other for providing a closed loop path for oscillations in off-axis regions, means for exciting said active medium, means for increasing the gain in off-axis regions comprising means forming dielectric boundaries for said regions and means for suppressing oscillations in the axial region, and means for extracting light energy from said device.

References Cited

UNITED STATES PATENTS 3,242,439   3/1966   Rigden et al. _____ 331—94.5

OTHER REFERENCES

Morokuma: A Laser With a Multihole Diaphragm, Journal of Research of the National Bureau of Standards, C. Engineering and Instrumentation, vol. 68C, No. 1 (January–March 1964) pp. 25-34.

JEWELL H. PEDERSEN, *Primary Examiner.*

W. L. SIKES, *Assistant Examiner.*